Feb. 12, 1952     J. A. HOWE ET AL     2,585,128
ALUMINUM OPTICAL MIRROR AND METHOD OF MAKING SAME
Filed March 1, 1946
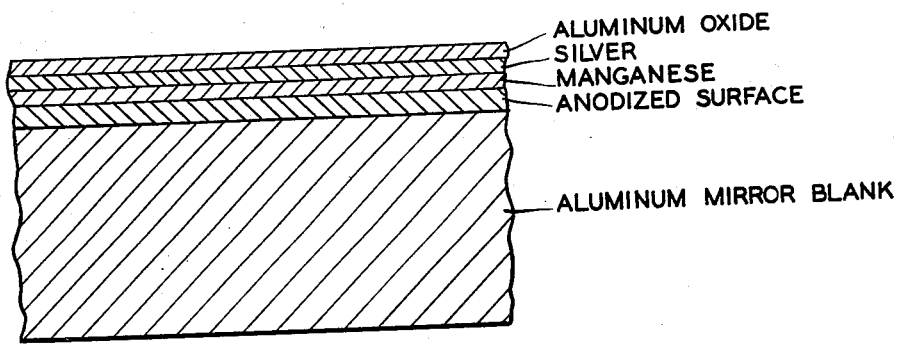
INVENTORS
JAMES A. HOWE
MICHAEL T. NEVALONNY
BY
- ATTORNEY -

Patented Feb. 12, 1952

2,585,128

UNITED STATES PATENT OFFICE 2,585,128

ALUMINUM OPTICAL MIRROR AND METHOD OF MAKING SAME

James A. Howe, Wood-Ridge, and Michael T. Nevalonny, Farmingdale, N. J., assignors to Bendix Aviation Corporation, Teterboro, N. J., a corporation of Delaware Application March 1, 1946, Serial No. 651,380

7 Claims. (Cl. 88—105)

1

This invention relates to a method of making optical mirrors of aluminum with a suitable polish and specular reflectivity for use in optical instruments of all types.

An object of the present invention is to provide a method of making optical mirrors of aluminum which may be surfaced to the same high degree of accuracy, and to the same quality of optical polish as is obtainable on optically worked glass.

A further object of this invention is to provide a method of making optical mirrors of aluminum which are accurate to within one-quarter wave length of light.

Another object of this invention is to provide a method of making aluminum optical mirrors which may be designed as part of an instrument housing and affixed to the housing, instead of a separate optical part requiring an accurate mounting within the housing.

Still another object of the invention is to provide a practical and efficient method of making aluminum optical mirrors which is well adapted to mass production methods, which is relatively inexpensive to practice, which shall comprise few and simple steps, and which shall have a large variety of applications in the manufacture of optical mirrors.

Other objects of the invention will in part be obvious, and in part hereinafter pointed out.

The invention accordingly consists in the combinations of procedural steps and in the elements and combinations thereof used in the method as exemplified in the description hereinafter made, and of which the scope of application will be indicated in the appended claims.

The attached drawing forming a part of this specification is a cross-sectional view of a mirror manufactured in accordance with the methods hereinafter described.

A method of manufacturing optical mirrors of aluminum consists essentially of the following steps:

A mirror blank of aluminum is first formed and an optically flat, smooth surface machined or lapped thereon. The flat surface is then hardened by anodizing, and polished by a standard lapping procedure to optical accuracy. The optical surface of the blank is then coated with a highly reflective film to complete the mirror.

Since the appearance and optical accuracy of the aluminum mirror is conditioned by the type of aluminum blank used, it is preferable that aluminum of at least 95 per cent purity be used. Best results are obtainable with aluminum mirror blanks of 99.5 per cent purity. Aluminum-silicon alloys must be avoided, as inclusions of silicon in the anodizing will produce a porous surface which will prevent a high degree of polish from being attained. The mirror blanks are preferably forged from bar stock. Other stock may be used, but it has been found that structural stresses in the aluminum due to rolling or other excessive working of the material, result in discontinuities in the anodized surface. Structurally stressed material should be avoided in all cases.

The mirror blank is drilled, counterbored and tapped as required for its mounting into an optical instrument. All machine work on the back of the blank is done at this time. The blank is then suitably mounted in a support and the mirror face machined flat to about .010 inch over the finished dimension. Bevels may now be cut on the edges and holes as required.

The partially machined blank may be stress-relieved by subjecting the same to a heat treatment for approximately one-half hour at a temperature of about 400° F.

The blank is then subjected to a machining operation to finish the mirror face of the blank to its final dimensions. The machining operation may be done by any suitable means available. The mirror face is preferably lapped to its finished optical dimensions using a diamond charged lap. Due to the relatively soft surface of the aluminum blank, loose abrasives are not used in this operation to avoid charging the mirror face with abrasive particles. These particles would result in minute surface ruptures during the anodizing step to follow. The dust and small particles resulting from this operation are removed to present a clean surface for the anodizing step.

The machined blank is now ready for the anodizing step. The purpose of anodizing the mirror surface of the blank is to provide a hard surface which can be lapped and polished to optical accuracy. The anodizing process may be carried out by any one of the processes known in the art which will coat the aluminum with aluminum oxide without materially discoloring the mirror face. The aluminum oxide surface has physical properties similar to glass and may accordingly be worked in a similar manner.

The mirror blank prior to the anodical oxidizing step is coated with an acid-resisting paint applied to all surfaces except the machined mirror face.

The anodizing process found acceptable for mirror purposes consists of immersing the blank in a 7.0 per cent sulfuric acid solution maintained at a temperature between 10° C. and 20° C. using a current density of approximately 12 amperes per square foot of exposed mirror face. Agitation of the solution is required. The blank is removed from the solution when an oxidized coating of required thickness is obtained. For most purposes, a coating of .001 inch thick is sufficient.

After the anodizing process, the blank is rinsed thoroughly in water to remove the acid solution, and wiped dry.

The anodized surface of the blank is now ready for lapping and polishing. This step in the process is not preceded by any grinding with loose abrasives as is customary with glass surfaces. The mirror face of the blank is polished much in the same manner as optical glass. A standard lapping machine may be used, the lap being of pitch and covered with a beeswax facing. A paste of cerium oxide or ordinary red rouge may be used as the lapping compound.

Testing the flatness of the mirror face is done by observing the interference fringes between a flat test plate and the polished surface. Polishing of the mirror face is complete when the desired degree of flatness is attained. Flatness to within one-quarter of a wave length of light is desirable in optical mirrors and is attained by the above procedure.

The polished surface of the mirror is grayish in color and reflective to a high degree for use in an optical instrument. A higher degree of reflectivity may be obtained by coating the mirror surface with the same wide variety of materials as used on polished glass surfaces, such as aluminum, platinum, rhodium, silver, etc.

It is preferable however, to provide for the mirror a film of the highest degree of reflectivity. To this end, silver is deposited on the mirror surface.

The silver and other reflective films are preferably deposited on the mirror surface by vaporizing the metal under a high vacuum and permitting the vaporized metal to condense on the polished surface, as is well known in the art. In the vaporization procedure, a test blank of glass is usually included with the blanks to be coated for observing the transparency or opacity of the deposited film, the process being halted when a desired film density is acquired.

It has been found that while silver, and other reflective metals, will adhere to the polished aluminum oxide surface, the reflective film deposited could very easily be wiped off. The deposited film, if permitted to remain, would become checked and subsequently peel off. It was found necessary to provide an intermediate film which would adhere to the aluminum oxide surface, and to which the reflective film would adhere.

Good results are obtained by providing an intermediate film of such metals as platinum, palladium, nickel, cobalt, silicon or chromium. These metals when vaporized will adhere to the aluminum oxide surface and provide an excellent bond for the subsequently deposited reflective film. In the production of aluminum mirrors however, the metals enumerated had several drawbacks; as for example, the high cost of palladium and platinum, the high vaporization temperatures, and the fact that these metal films were not readily removable from the aluminum blank without spoilage thereof in the event it became necessary due to a faulty film deposit.

Best results are obtainable by the use of manganese for the intermediate layer. This metal evaporates very easily, silver adheres to it very strongly, and both the manganese and silver may be readily removed with nitric acid without destructive effects on the polished anodized surface. A thin film or flash of manganese is all that is required to hold the silver to the mirror.

The relatively soft coating of the reflective film is then protected by a transparent oxide coating. In carrying out the process for binocular mirrors, a thin film of aluminum oxide was evaporated over the silver film to protect the silver and to prevent tarnishing thereof.

To those skilled in the art it will be obvious that the above process may be used to advantage in the manufacture of spherical and cylindrical mirrors of any required radii.

It will thus be seen that there is provided a method of making optical mirrors of aluminum in which the several objects of this invention are achieved, and which is well adapted to meet the conditions of practical use.

As various possible embodiments might be made of the above invention, and as various changes might be made in the embodiment above set forth, it is to be understood that all matter herein set forth is to be interpreted as illustrative and not in a limiting sense.

Having thus described our invention, we claim as new and desire to secure by Letters Patent:

1. The method of making aluminum mirrors comprising machining an aluminum mirror blank to the finished dimensions of the mirror to be formed, oxidizing the machined surface, lapping the machined oxidized surface to a desired degree of optical accuracy, and depositing by vaporization a film of manganese on said oxidized surface and a film of silver.

2. The method of making aluminum mirrors comprising machining an aluminum mirror blank to approximately the finished dimensions of the mirror to be formed, stress-relieving said blank by heating, machining the surface of said blank to its finished dimensions, oxidizing said surface, lapping and polishing the oxidized surface to a desired degree of accuracy, and successively depositing on the polished surface by vaporation under a high vacuum a metallic intermediate film of manganese and a film of silver.

3. The method of making aluminum mirrors comprising, machining a surface of a forged high purity aluminum mirror blank, to approximately the finished dimensions of the mirror to be formed, stress-relieving said blank by heating, lapping the surface of said blank to its finished dimensions, anodically oxidizing said surface, polishing the oxidized surface to a desired degree of optical accuracy, and successively depositing on the polished surface by vaporization under a high vacuum a film of manganese, a film of silver, and then a transparent film of aluminum oxide.

4. In a method of making aluminum mirrors, the steps comprising, anodically producing an aluminum oxide surface on an aluminum base, polishing said surface, and depositing by vaporization under a high vacuum a film of manganese on the polished surface prior to depositing a silver film thereon.

5. A mirror comprising an aluminum blank, an optically flat aluminum oxide surface thereon, a film of manganese adhering to said oxide surface, and a film of silver over said manganese film.

6. A mirror comprising an aluminum blank, an optically flat aluminum oxide surface thereon, a film of manganese on said oxide surface, a film of silver over said manganese film, and a transparent aluminum oxide film covering said silver film.

7. In a method of making aluminum mirrors, the steps comprising lapping an aluminum oxide surfaced aluminum base to an optically flat condition, coating by vaporization said aluminum oxide surface with a layer of manganese, and depositing by vaporization a layer of silver to the manganese layer.

JAMES A. HOWE.
MICHAEL T. NEVALONNY.

REFERENCES CITED

The following references are of record in the file of this patent:

UNITED STATES PATENTS

| Number | Name | Date |
| --- | --- | --- |
| 915,415 | Cowper-Coles | Mar. 16, 1909 |
| 1,515,658 | Cole | Nov. 18, 1924 |
| 1,923,790 | Moore | Aug. 22, 1933 |
| 2,108,604 | Mason | Feb. 15, 1938 |
| 2,304,182 | Lang | Dec. 8, 1942 |
| 2,394,930 | McRae | Feb. 15, 1946 |
| 2,482,054 | Colbert | Sept. 13, 1949 |

FOREIGN PATENTS

| Number | Country | Date |
| --- | --- | --- |
| 343,424 | Great Britain | Feb. 12, 1931 |
| 395,611 | Great Britain | July 20, 1933 |
| 404,595 | Great Britain | Apr. 9, 1932 |

OTHER REFERENCES

Metals Handbook, 1939 edition, American Society for Metals, pages 1312, 1313.

F. Twyman, Prisms and Lens Making, 1942, pp. 5, 6, 7, 25, 43 (Jerrell-Ash Co., Boston, Mass.).

Charles Deve Optical Workshop Principles, translated by T. L. Tippell, 1942, pp. 93, 94, 95 (Jerrell-Ash Co., Boston, Mass.).